(12) United States Patent
Ramo et al.

(10) Patent No.: US 9,542,149 B2
(45) Date of Patent: Jan. 10, 2017

(54) METHOD AND APPARATUS FOR DETECTING AUDIO SAMPLING RATE

(75) Inventors: Anssi Sakari Ramo, Tampere (FI); Adriana Vasilache, Tampere (FI); Lasse Juhani Laaksonen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 217 days.

(21) Appl. No.: 14/357,210

(22) PCT Filed: Nov. 10, 2011

(86) PCT No.: PCT/FI2011/050998
§ 371 (c)(1),
(2), (4) Date: May 8, 2014

(87) PCT Pub. No.: WO2013/068634
PCT Pub. Date: May 16, 2013

(65) Prior Publication Data
US 2014/0330415 A1 Nov. 6, 2014

(51) Int. Cl.
*G06F 17/00* (2006.01)
*G06F 3/16* (2006.01)
(Continued)

(52) U.S. Cl.
CPC .............. *G06F 3/165* (2013.01); *G10L 19/06* (2013.01); *G10L 19/07* (2013.01); *G10L 19/24* (2013.01); *G10L 19/26* (2013.01)

(58) Field of Classification Search
CPC .......... G06F 3/165; G10L 19/06; G10L 19/07; G10L 19/24; G10L 19/26
See application file for complete search history.

(56) References Cited

U.S. PATENT DOCUMENTS

| 6,658,383 | B2 | 12/2003 | Koishida et al. |
| 2005/0143984 | A1 | 6/2005 | Makinen et al. |
| 2006/0271354 | A1* | 11/2006 | Sun ........................ G10L 19/26 704/205 |

FOREIGN PATENT DOCUMENTS

| EP | 0658873 | 6/1995 |
| EP | 0785419 | 7/1997 |

(Continued)

OTHER PUBLICATIONS

Extended European Search Report received for corresponding European Patent Application No. 11875412.6, dated Jun. 8, 2015, 6 pages.

(Continued)

*Primary Examiner* — Fan Tsang
*Assistant Examiner* — David Siegel
(74) *Attorney, Agent, or Firm* — Alston & Bird LLP

(57) ABSTRACT

It is inter alia disclosed to receive a set of encoded audio parameters for an audio frame, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder; to convert the indices to the at least two quantized line spectral frequency coefficients; and to determine the sampling frequency for the audio frame by checking the value of a highest order quantized line spectral frequency coefficient of the at least two quantized line spectral frequency coefficients.

16 Claims, 2 Drawing Sheets

(51) Int. Cl.
*G10L 19/26* (2013.01)
*G10L 19/06* (2013.01)
*G10L 19/24* (2013.01)
*G10L 19/07* (2013.01)

(56) References Cited

FOREIGN PATENT DOCUMENTS

| EP | 1024477 | 8/2000 |
| EP | 1785985 A1 | 5/2007 |

OTHER PUBLICATIONS

International Search Report and Written Opinion received for corresponding Patent Cooperation Treaty Application No. PCT/FI2011/050998, dated Aug. 30, 2012, 13 pages.
Jelinek M. et al. "Wideband speech coding advances in VMP-WB standard," IEEE Transactions on Audio, Speech, and Language processing, vol. 15, No. 3, May 2000, pp. 1167-1179.
Decision to Grant European Application No. 11875412.6 dated Apr. 7, 2016.

* cited by examiner

METHOD AND APPARATUS FOR DETECTING AUDIO SAMPLING RATE

RELATED APPLICATION

This application was originally filed as PCT Application No. PCT/FI2011/050998 filed Nov. 10, 2011.

FIELD OF THE APPLICATION

The present application relates to coding, and in particular, but not exclusively to speech or audio coding.

BACKGROUND OF THE APPLICATION

Audio signals, like speech or music, are encoded for example to enable efficient transmission or storage of the audio signals.

Audio encoders and decoders are used to represent audio based signals, such as music and background noise. These types of coders typically do not utilise a speech model for the coding process, rather they use processes for representing all types of audio signals, including speech.

Speech encoders and decoders (codecs) are usually optimised for speech signals, and can operate at either a fixed or variable bit rate.

Speech and audio codecs can also be configured to operate with varying bit rates. At lower bit rates, such a codec may work with speech signals at a coding rate equivalent to a pure speech codec. At higher bit rates, the codec may code any signal including music, background noise and speech, with higher quality and performance.

Speech and audio codecs can use linear predictive coding in order to efficiently represent short term correlations in the signal.

Speech and audio codecs typically realise Linear Predictive Coding by adopting an autoregressive (AR) filter to model the short term correlations in the signal. The coefficients of the filter are known as Linear Predictive (LP) coefficients where the number of coefficients is determined by the order of the AR filter.

The LP coefficients can be determined using linear predictive analysis. The analysis may be regularly performed on the input audio or speech signal for different instances of time, resulting in frequent updates to the set of LP coefficients.

LP coefficients are typically transformed to Line Spectral Frequencies (LSF) in order to facilitate the storage or transmission over a communication channel.

Variable bit rate speech and audio coding can use a varying number of LP coefficients when coding the input speech signal.

Furthermore a variable bit rate speech and audio codec also may support different bandwidths with the same number of LP coefficients.

For example, a variable bit rate speech and audio codec may vary the LPC coding order depending on the bandwidth or sampling frequency of the signal to be coded.

Alternatively, a variable bit rate speech and audio codec may code an audio signal sampled at any one of a number of sampling rates using the same or similar LPC coding order. Consequently any change to the LP coding order or sampling frequency is required to be signalled to the decoder, as this can result in a change in the mode of decoding.

Variable bit rate codecs can transmit the LP coding order or sampling rate in the form of an index flag as part of the coded bit stream.

However, transmission of the LP coding order or sampling rate incurs the penalty of additional bits in the encoded bit stream.

SUMMARY OF THE APPLICATION

This application proceeds from the consideration that variable bit rate speech and audio codecs can deploy variable order linear predictive coding analysis with varying sampling rates when coding the input signal. Therefore as part of the coding scheme the decoder is required to be notified of the LP coding order and/or sampling rate. Whilst this information can be represented in a few bits it is nevertheless desirable that the coding overhead of signalling the LP coding order and sampling rate is removed.

The following embodiments aim to address the above problem.

According to an aspect of there is provided a method comprising: determining at least two linear prediction coefficients for an audio frame digitally sampled at a first sampling rate; converting the at least two linear prediction coefficients to at least two line spectral frequency coefficients; and quantising each of the at least two line spectral frequency coefficients to produce at least two quantized line spectral frequency coefficients, a highest order quantized line spectral frequency coefficient of the at least two quantized line spectral frequency coefficients is in a first frequency range of at least two frequency ranges, the first frequency range is associated with the first sampling rate, and the first frequency range is distinguishable from a second frequency range of the at least two frequency ranges, the second frequency range is associated with a highest order quantized line spectral frequency for an audio frame digitally sampled at a second sampling rate.

The first frequency range of the at least two frequency ranges may span the frequencies between a first low frequency limit and a first high frequency limit, and the second frequency range of the at least two frequency ranges may span the frequencies between a second low frequency limit and a second high frequency limit, and the frequencies spanned by the first frequency range are different from the range of frequencies spanned by the second frequency range.

The first sampling frequency may be 12.8 kHz and the first frequency range may span the frequencies between the first low frequency limit of 3950 Hz and the first high frequency limit of 6350 Hz, and the second sampling frequency may be 16 kHz and the second frequency range may span the frequencies between the second low frequency limit of 6350 Hz and the second high frequency limit of 7950 Hz.

According to another aspect, there is a method comprising receiving, a set of encoded audio parameters for an audio frame, the set comprises indices representing at least two quantized line spectral frequency coefficients, the audio frame when decoded comprises audio samples digitally sampled at a sampling frequency, the sampling frequency is one of a plurality of sampling frequencies for an audio decoder; converting the indices to the at least two quantized line spectral frequency coefficients; and determining the sampling frequency for the audio frame by checking the value of a highest order quantized line spectral frequency coefficient of the at least two quantized line spectral frequency coefficients.

The checking the value of the highest order quantized line spectral frequency coefficient may comprise: comparing the highest order quantized line spectral frequency coefficient to each of a plurality of frequency ranges, a first frequency range of the plurality of frequency ranges is associated with a first sampling frequency, and a second frequency range of the plurality of frequency ranges is associated with a second sampling frequency; determining the sampling frequency of the audio frame to be the first sampling frequency when the highest order quantized line spectral frequency coefficient may be in the first frequency range; and determining the sampling frequency of the audio frame to be the second sampling frequency when the highest order quantized line spectral frequency coefficient may be in the second frequency range.

The first frequency range of the plurality of frequency ranges may span the frequencies between a first low frequency limit and a first high frequency limit, and the second frequency range of the plurality of frequency ranges may span the frequencies between a second low frequency limit and a second high frequency limit, and the frequencies spanned by the first frequency range are different from the range of frequencies spanned by the second frequency range.

Each of the plurality of sampling frequencies may be each associated with one of a plurality of different modes of operation of the audio decoder, and the determined sampling frequency of the audio frame may be associated with one of the plurality of different modes of operation of the audio decoder.

The plurality of sampling frequencies may comprise 12.8 kHz and 16 kHz, the frequency range for the sampling frequency of 12.8 kHz may have a low frequency limit of 3950 Hz and a high frequency limit of 6350 Hz, and the frequency range for the sampling frequency of 16 kHz may have a low frequency limit of 6350 and a high frequency limit of 7950 Hz respectively.

According to a further aspect, there is provided an apparatus comprising at least one processor and at least one memory including computer code for one or more programs, the at least one memory and the computer code configured to with the at least one processor cause the apparatus to at least perform: determining at least two linear prediction coefficients for an audio frame digitally sampled at a first sampling rate; converting the at least two linear prediction coefficients to at least two line spectral frequency coefficients; and quantising each of the at least two line spectral frequency coefficients to produce at least two quantized line spectral frequency coefficients, a highest order quantized line spectral frequency coefficient of the at least two quantized line spectral frequency coefficients is in a first frequency range of at least two frequency ranges, the first frequency range is associated with the first sampling rate, and the first frequency range is distinguishable from a second frequency range of the at least two frequency ranges, the second frequency range is associated with a highest order quantized line spectral frequency for an audio frame digitally sampled at a second sampling rate.

The first frequency range of the at least two frequency ranges may span the frequencies between a first low frequency limit and a first high frequency limit, the second frequency range of the at least two frequency ranges may span the frequencies between a second low frequency limit and a second high frequency limit, and the frequencies spanned by the first frequency range are different from the range of frequencies spanned by the second frequency range.

The first sampling frequency may be 12.8 kHz and the first frequency range may span the frequencies between the first low frequency limit of 3950 Hz and the first high frequency limit of 6350 Hz, and the second sampling frequency may be 16 kHz and the second frequency range may span the frequencies between the second low frequency limit of 6350 Hz and the second high frequency limit of 7950 Hz.

According to a further aspect there is provided an apparatus comprising at least one processor and at least one memory including computer code for one or more programs, the at least one memory and the computer code configured to with the at least one processor cause the apparatus to at least perform: receiving a set of encoded audio parameters, the set comprises indices representing at least two quantized line spectral frequency coefficients, the audio frame when decoded comprises audio samples digitally sampled at a sampling frequency, the sampling frequency is one of a plurality of sampling frequencies for an audio decoder; converting the indices to the at least two quantized line spectral frequency coefficients; and determining the sampling frequency for the audio frame by checking the value of a highest order quantized line spectral frequency coefficient of the at least two quantized line spectral frequency coefficients.

The computer readable code when executed may control the at least one processor to perform checking the value of a highest order quantized line spectral frequency coefficient of the at least two quantized line spectral frequency coefficients by: comparing the highest order quantized line spectral frequency coefficient to each of a plurality of frequency ranges, a first frequency range of the plurality of frequency ranges may be associated with a first sampling frequency, and a second frequency range of the plurality of frequency ranges may be associated with a second sampling frequency; determining the sampling frequency of the audio frame to be the first sampling frequency when the highest order quantized line spectral frequency coefficient may be in the first frequency range; and determining the sampling frequency of the audio frame to be the second sampling frequency when the highest order quantized line spectral frequency coefficient may be in the second frequency range.

The first frequency range of the plurality of frequency ranges may span the frequencies between a first low frequency limit and a first high frequency limit, and the second frequency range of the plurality of frequency ranges may span the frequencies between a second low frequency limit and a second high frequency limit, and the frequencies spanned by the first frequency range may be different from the range of frequencies spanned by the second frequency range.

Each of the plurality of sampling frequencies may be each associated with one of a plurality of different modes of operation of the audio decoder, and the determined sampling frequency of the audio frame may be associated with one of the plurality of different modes of operation of the audio decoder.

The plurality of sampling frequencies may comprise 12.8 kHz and 16 kHz, the frequency range for the sampling frequency of 12.8 kHz may have a low frequency limit of 3950 Hz and a high frequency limit of 6350 Hz, and the frequency range for the sampling frequency of 16 kHz may have a low frequency limit of 6350 and a high frequency limit of 7950 Hz respectively.

According to a further aspect there is provided a non-transitory computer-readable storage medium having stored thereon computer-readable code, which, when executed by computing apparatus, causes the computing apparatus to perform a method comprising: determining at least two linear prediction coefficients for an audio frame digitally sampled at a first sampling rate; converting the at least two linear prediction coefficients to at least two line spectral frequency coefficients; and quantising each of the at least two line spectral frequency coefficients to produce at least two quantized line spectral frequency coefficients, a highest order quantized line spectral frequency coefficient of the at least two quantized line spectral frequency coefficients is in a first frequency range of at least two frequency ranges, the first frequency range is associated with the first sampling rate, and the first frequency range is distinguishable from a second frequency range of the at least two frequency ranges, the second frequency range is associated with a highest order quantized line spectral frequency for an audio frame digitally sampled at a second sampling rate.

The first frequency range of the at least two frequency ranges may span the frequencies between a first low frequency limit and a first high frequency limit, the second frequency range of the at least two frequency ranges may span the frequencies between a second low frequency limit and a second high frequency limit, and the frequencies spanned by the first frequency range may be different from the range of frequencies spanned by the second frequency range.

The first sampling frequency may be 12.8 kHz and the first frequency range may span the frequencies between the first low frequency limit of 3950 Hz and the first high frequency limit of 6350 Hz, and the second sampling frequency may be 16 kHz and the second frequency range may span the frequencies between the second low frequency limit of 6350 Hz and the second high frequency limit of 7950 Hz.

According to a further aspect there is provided a non-transitory computer-readable storage medium having stored thereon computer-readable code, which, when executed by computing apparatus, causes the computing apparatus to perform a method comprising: receiving a set of encoded audio parameters for an audio frame, the set comprises indices representing at least two quantized line spectral frequency coefficients, the audio frame when decoded comprises audio samples digitally sampled at a sampling frequency, the sampling frequency is one of a plurality of sampling frequencies for an audio decoder; converting the indices to the at least two quantized line spectral frequency coefficients; and determining the sampling frequency for the audio frame by checking the value of a highest order quantized line spectral frequency coefficient of the at least two quantized line spectral frequency coefficients.

The computer-readable code, which, when executed by computing apparatus, may cause the computing apparatus to perform checking the value of a highest order quantized line spectral frequency coefficient of the at least two quantized line spectral frequency coefficients by comparing the highest order quantized line spectral frequency coefficient to each of a plurality of frequency ranges, a first frequency range of the plurality of frequency ranges may be associated with a first sampling frequency, and a second frequency range of the plurality of frequency ranges may be associated with a second sampling frequency; determining the sampling frequency of the audio frame to be the first sampling frequency when the highest order quantized line spectral frequency coefficient may be in the first frequency range; and determining the sampling frequency of the audio frame to be the second sampling frequency when the highest order quantized line spectral frequency coefficient may be in the second frequency range.

The first frequency range of the plurality of frequency ranges may span the frequencies between a first low frequency limit and a first high frequency limit, and the second frequency range of the plurality of frequency ranges may span the frequencies between a second low frequency limit and a second high frequency limit, and the frequencies spanned by the first frequency range may be different from the range of frequencies spanned by the second frequency range.

Each of the plurality of sampling frequencies may be each associated with one of a plurality of different modes of operation of the audio decoder, and the determined sampling frequency of the audio frame may be associated with one of the plurality of different modes of operation of the audio decoder.

The plurality of sampling frequencies may comprise 12.8 kHz and 16 kHz, the frequency range for the sampling frequency of 12.8 kHz may have a low frequency limit of 3950 Hz and a high frequency limit of 6350 Hz, and the frequency range for the sampling frequency of 16 kHz may have a low frequency limit of 6350 and a high frequency limit of 7950 Hz respectively.

According to a further aspect there is provided an apparatus comprising: means for determining at least two linear prediction coefficients for an audio frame digitally sampled at a first sampling rate; means for converting the at least two linear prediction coefficients to at least two line spectral frequency coefficients; and means for quantising each of the at least two line spectral frequency coefficients to produce at least two quantized line spectral frequency coefficients, a highest order quantized line spectral frequency coefficient of the at least two quantized line spectral frequency coefficients is in a first frequency range of at least two frequency ranges, the first frequency range is associated with the first sampling rate, and the first frequency range is distinguishable from a second frequency range of the at least two frequency ranges, the second frequency range is associated with a highest order quantized line spectral frequency for an audio frame digitally sampled at a second sampling rate.

The first frequency range of the at least two frequency ranges may span the frequencies between a first low frequency limit and a first high frequency limit, the second frequency range of the at least two frequency ranges may span the frequencies between a second low frequency limit and a second high frequency limit, and the frequencies spanned by the first frequency range may be different from the range of frequencies spanned by the second frequency range.

The first sampling frequency may be 12.8 kHz and the first frequency range may span the frequencies between the first low frequency limit of 3950 Hz and the first high frequency limit of 6350 Hz, and the second sampling frequency may be 16 kHz and the second frequency range may span the frequencies between the second low frequency limit of 6350 Hz and the second high frequency limit of 7950 Hz.

According to a further aspect there is provided an apparatus comprising: means for receiving a set of encoded audio parameters for an audio frame, the set comprises indices representing at least two quantized line spectral frequency coefficients, the audio frame when decoded comprises audio samples digitally sampled at a sampling frequency, the sampling frequency is one of a plurality of sampling frequencies for an audio decoder; means for converting the indices to the at least two quantized line spectral frequency coefficients; and means for determining the sampling frequency for the audio frame by having means for checking the value of a highest order quantized line spectral frequency coefficient of the at least two quantized line spectral frequency coefficients.

The means for checking the value of the highest order quantized line spectral frequency coefficient may comprise: means for comparing the highest order quantized line spectral frequency coefficient to each of a plurality of frequency ranges, a first frequency range of the plurality of frequency ranges may be associated with a first sampling frequency, and a second frequency range of the plurality of frequency ranges may be associated with a second sampling frequency; means for determining the sampling frequency of the audio frame to be the first sampling frequency when the highest order quantized line spectral frequency coefficient may be in the first frequency range; and means for determining the sampling frequency of the audio frame to be the second sampling frequency when the highest order quantized line spectral frequency coefficient may be in the second frequency range.

The first frequency range of the plurality of frequency ranges may span the frequencies between a first low frequency limit and a first high frequency limit, the second frequency range of the plurality of frequency ranges may span the frequencies between a second low frequency limit and a second high frequency limit, and the frequencies spanned by the first frequency range may be different from the range of frequencies spanned by the second frequency range.

Each of the plurality of sampling frequencies may be each associated with one of a plurality of different modes of operation of the audio decoder, and the determined sampling frequency of the audio frame may be associated with one of the plurality of different modes of operation of the audio decoder.

The plurality of sampling frequencies may comprise 12.8 kHz and 16 kHz, the frequency range for the sampling frequency of 12.8 kHz may have a low frequency limit of 3950 Hz and a high frequency limit of 6350 Hz, and the frequency range for the sampling frequency of 16 kHz may have a low frequency limit of 6350 and a high frequency limit of 7950 Hz respectively.

According to a further aspect there is provided a computer program comprising instructions that when executed by a computer apparatus control it to perform the method as discussed herein.

BRIEF DESCRIPTION OF DRAWINGS

For better understanding of the present invention, reference will now be made by way of example to the accompanying drawings in which.

DESCRIPTION OF SOME EMBODIMENTS OF THE APPLICATION

Figure 1:
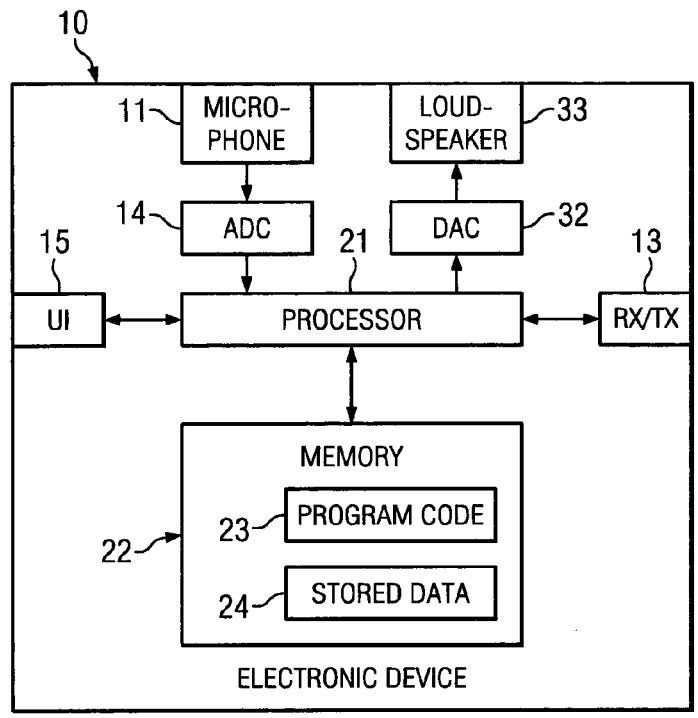
FIG. 1 shows schematically an apparatus suitable for employing some embodiments of the application.

The following describes in more detail possible codec mechanisms for the provision of LP coding or LSF order and/or sampling rate identification in audio and speech codecs. In this regard reference is first made to FIG. 1 which shows a schematic block diagram of an exemplary electronic device or apparatus 10, which may incorporate a codec according to embodiments of the application.

The apparatus 10 may for example be a mobile terminal or user equipment of a wireless communication system. In other embodiments the apparatus 10 may be an audio-video device such as video camera, a Television (TV) receiver, audio recorder or audio player such as a mp3 recorder/player, a media recorder (also known as a mp4 recorder/player), or any computer suitable for the processing of audio signals.

The apparatus 10 in some embodiments comprises a microphone 11, which is linked via an analogue-to-digital converter (ADC) 14 to a processor 21. The processor 21 is further linked via a digital-to-analogue (DAC) converter 32 to loudspeakers 33. The processor 21 is further linked to a transceiver (RX/TX) 13, to a user interface (UI) 15 and to a memory 22.

The processor 21 may be configured to execute various program codes. The implemented program codes in some embodiments comprise an audio encoding code for encoding a lower frequency band of an audio signal and a higher frequency band of an audio signal. The implemented program codes 23 in some embodiments further comprise an audio and speech decoding code. The implemented program codes 23 can in some embodiments be stored for example in the memory 22 for retrieval by the processor 21 whenever needed. The memory 22 could further provide a section 24 for storing data, for example data that has been encoded in accordance with embodiments of the application.

The encoding and decoding code in embodiments can be implemented in hardware or firmware.

The user interface 15 enables a user to input commands to the apparatus 10, for example via a keypad, and/or to obtain information from the apparatus 10, for example via a display. In some embodiments a touch screen may provide both input and output functions for the user interface. The apparatus 10 in some embodiments comprises a transceiver 13 suitable for enabling communication with other apparatus, for example via a wireless communication network.

It is to be understood again that the structure of the apparatus 10 could be supplemented and varied in many ways.

A user of the apparatus 10 for example can use the microphone 11 for inputting speech or other audio signals that are to be transmitted to some other apparatus or that are to be stored in the data section 24 of the memory 22. A corresponding application in some embodiments can be activated to this end by the user via the user interface 15. This application in these embodiments can be performed by the processor 21, causes the processor 21 to execute the encoding code stored in the memory 22.

The analogue-to-digital converter (ADC) 14 in some embodiments converts the input analogue audio signal into a digital audio signal and provides the digital audio signal to the processor 21. In some embodiments the microphone 11 can comprise an integrated microphone and ADC function and provide digital audio signals directly to the processor for processing.

The processor 21 in such embodiments then can process the digital audio signal in the same way as described with reference to FIGS. 3 to 5.

The resulting bit stream can in some embodiments be provided to the transceiver 13 for transmission to another apparatus. Alternatively, the coded audio or speech data in some embodiments can be stored in the data section 24 of the memory 22, for instance for a later transmission or for a later presentation by the same apparatus 10.

The apparatus 10 in some embodiments can also receive a bit stream with correspondingly encoded data from another apparatus via the transceiver 13. In this example, the processor 21 may execute the decoding program code stored in the memory 22. The processor 21 in such embodiments decodes the received data, and provides the decoded data to a digital-to-analogue converter 32. The digital-to-analogue converter 32 converts the digital decoded data into analogue audio data and can in some embodiments output the analogue audio via the loudspeakers 33. Execution of the decoding program code in some embodiments can be triggered as well by an application called by the user via the user interface 15.

The received encoded data in some embodiments can also be stored instead of an immediate presentation via the loudspeakers 33 in the data section 24 of the memory 22, for instance for later decoding and presentation or decoding and forwarding to still another apparatus.

Figure 3:
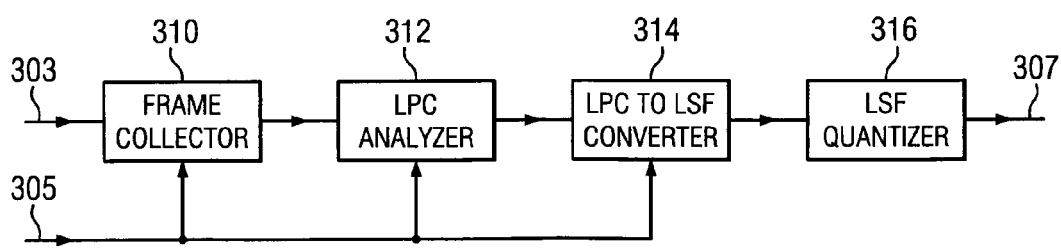
FIG. 3 shows schematically an encoder part of the audio codec system shown in FIG. 2 according to some embodiments of the application.
Figure 4:
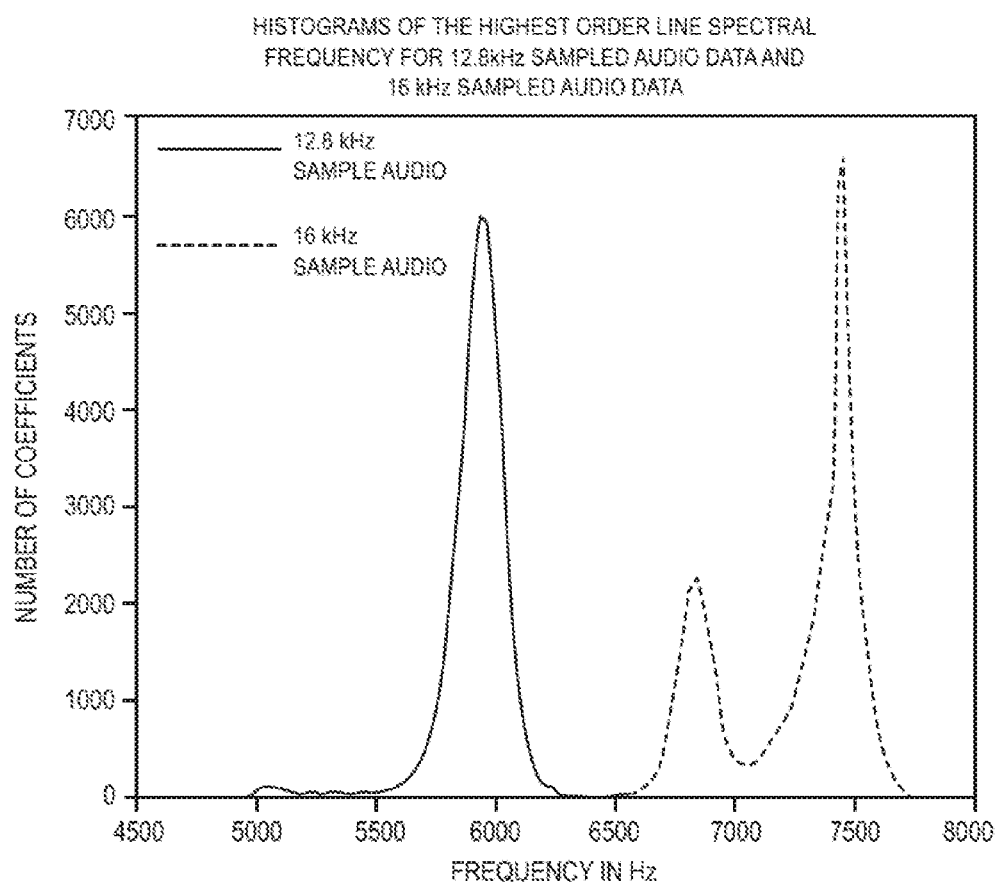
FIG. 4 shows a schematic view depicting a histogram of the highest order line spectral frequency for 12.8 kHz sampled audio data, and a histogram of the highest order line spectral frequency for 16 kHz samples audio data according to some embodiments of the application.
Figure 5:
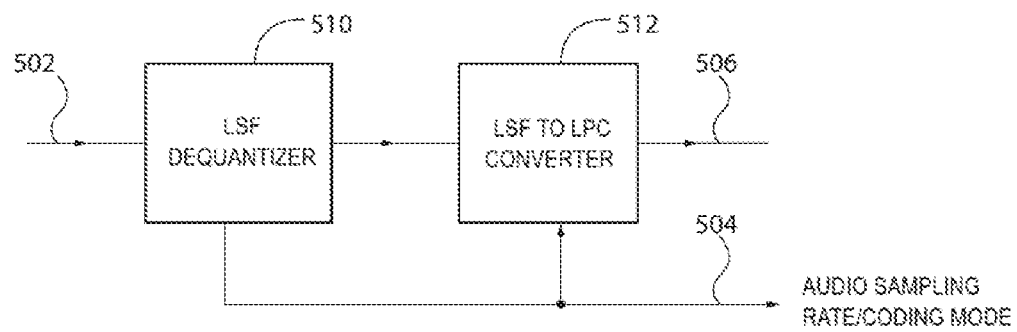
FIG. 5 shows schematically a decoder part of the audio codec system as shown in FIG. 2.

It would be appreciated that the schematic structures described in FIGS. 3 to 5 represent only a part of the operation of an audio codec as exemplarily shown implemented in the apparatus shown in FIG. 1.

Figure 2:
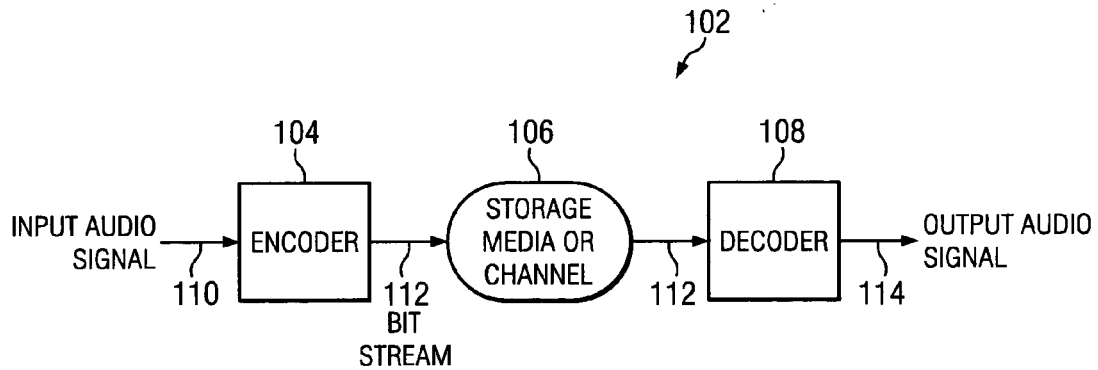
FIG. 2 shows schematically an audio codec system suitable employing some embodiments of the application.

The general operation of audio codecs as employed by embodiments of the application is shown in FIG. 2. General audio and speech coding comprise an encoder, as illustrated schematically in FIG. 2. Illustrated by FIG. 2 is a system 102 with an encoder 104, and a storage or media channel 106. It would be understood that as described above some embodiments of the apparatus 10 can comprise or implement an encoder 104.

The encoder 104 compresses an input audio signal 110 producing a bit stream 112, which in some embodiments can be stored or transmitted through a media channel 106. The bit stream 112 can be received within the decoder 108. The decoder 108 decompresses the bit stream 112 and produces an output audio signal 114. The bit rate of the bit stream 112 and the quality of the output audio signal 114 in relation to the input signal 110 are the main features which define the performance of the coding system 102.

FIG. 3 shows schematically some components of the encoder 104 according to embodiments of the application. Components of the encoder 104 may comprise an input 303 arranged to receive an audio signal.

The audio signal received via the input 303 may be connected to the input of a frame collector 310.

It is to be understood in embodiments that the frame collector 310 can receive audio signals which have been sampled at one of a number of different sampling rates.

For example, in a first group of embodiments the input 303 may receive an audio signal which has been sampled at least with some of the following sampling frequencies 8000 Hz, 12800 Hz, 16000 Hz, 25600 Hz, 32000 Hz and 48000 Hz.

Alternatively in another group of embodiments other sampling rate sets may be used such as 11025, 22050, and 44100 Hz.

The frame collector 310 may also be arranged to receive a further input signal which conveys the sampling frequency of the audio signal. With reference to FIG. 3, the further input is depicted as connection 305.

In embodiments the frame collector 310 may collate a plurality of input Pulse Code Modulated (PCM) samples in order to form a frame of audio samples. The number of samples in each frame may be determined by the sampling frequency and audio bandwidth of the input audio signal. For example, in a first group of embodiments the frame collector 310 may collate the input audio samples into a frame size of 160, 256 or 320 samples for audio sample frequencies of 8 kHz, 12.8 kHz or 16 kHz respectively.

In some embodiments the frame collector 310 may apply a window function to the frame of audio samples. For example, in the first group of embodiments the frame collector may apply a Hamming window function. However, other embodiments may use window functions such as: Hanning, Kaiser, Blackman or Bartlett.

The output of the frame collector 310 may be arranged to be connected to the input of a LPC analyser 312.

Additionally, the LPC analyser 312 may also be arranged to receive the input 305 which conveys the sampling frequency of the audio signal. The LPC analyser 312 may analyse the input audio frame in order to determine the prediction or filter coefficients for any subsequent prediction stage.

In a first group of embodiments the prediction coefficients as determined by the LPC analyser 312 are the LP coefficients. The number of LP coefficients, in other words the predictor order, may be dependent on the sampling frequency of the audio signal.

For example, the LPC analyser 312 may be notified via the signal line 305 that the input audio signal is sampled at a sampling frequency of 8 kHz. In this particular example the LPC analyser may determine the prediction order to be ten, or in other words the LPC analyser will produce ten LP coefficients for each frame of sampled audio.

In another example of the first group of embodiments, the LPC analyser may be informed by the signal line 305 that the audio signal is sampled at a rate of 16 kHz. In this example, the LPC analyser may determine the prediction order to be sixteen, thereby producing sixteen LP coefficients for each audio frame. Similarly for the 12.8 kHz sampling rate, the LPC analyser may determine the prediction order to be sixteen, thereby producing sixteen LP coefficients for each audio frame.

In some embodiments the analysis of the short term correlations in the audio frame may be accomplished by linear predictive coding (LPC) analysis. This technique relies on calculating either the autocovariance or autocorrelation of the audio frame over a range of different sample delays. The range of sample delays can be determined by the prediction order.

In a first group of embodiments the LPC analysis can be performed using the autocorrelation method whereby the result of calculating the autocorrelations over the range of different delays as determined by the prediction order may be formed into a symmetrical square matrix known as a Toeplitz matrix. The Toeplitz matrix has the property that it is symmetrical about the leading diagonal and all the elements along any given diagonal are equal. In order to determine the LP coefficients the matrix may be inverted using the Levinson-Durbin algorithm.

In a second group of embodiments the LPC analysis may be performed using the autocovariance method.

The autocovariance method calculates the covariance of an audio frame over a range of different sample delays. The maximum delay in terms of the number of samples is determined by the prediction order. The covariance calculations for the different sample delays may be arranged in the form of a matrix whose order is given by the LPC prediction order.

It is to be understood in the second group of embodiments that the covariance matrix is symmetrical about the leading diagonal. However, unlike the Toeplitz matrix the values within a given diagonal are not necessary the same. As before, in these embodiments the LP coefficients may also be found by inverting the matrix. However, unlike the Toeplitz matrix of the first group of embodiments the matrix can be inverted using Cholesky Decomposition.

In other words there is provided means for determining at least two linear prediction coefficients for an audio frame digitally samples at a first sampling rate.

The output from the LPC analyser, in other words the LP coefficients may be connected to the LPC to LSF converter 314 together with the sampling rate signal 305.

In embodiments the LPC to LSF converter 314 can convert the LP coefficients to LSF coefficients.

The conversion of the LPC coefficients to LSF coefficients may be performed by decomposing the numerator of the AR filter model into two polynomials, where a first polynomial may be viewed as representing the vocal tract with the glottis closed and the second polynomial may be viewed as representing the vocal tract with the glottis open. Line spectral pairs (LSP) may then be determined by calculating the roots of the two polynomials, which lie on the unit circle and occur in symmetrical pairs. The roots can be calculated using any one of a number of techniques known in the art such as; the Chebyshev series method, the ratio filter method, or the adaptive sequential least mean square method.

Once the LSP have been calculated they may be converted to their LSF representation. The LSP to LSF conversion may be achieved by noting that the LSF is determined to be the angular position of the roots between zero and pi.

It is to be appreciated in embodiments that the number of LSF coefficients in the set of LSF coefficients will be the same as the number of LP coefficients in the set of LP coefficients. In other words, the number of LSFs will be the same as the prediction order. For example, if a tenth order LPC analysis was performed over the input audio frame then the set of ten LP coefficients would be transformed into a set of ten LSF coefficients.

In other words there is provided means for converting at least two linear prediction coefficients to at least two line spectral frequency coeffcients.

It is to be further appreciated in embodiments that the set of LSF coefficients have the property that they increase monotonically. In other words, the angular frequencies of each LSF coefficient of the set of LSF coefficients satisfies the following equation, $$0 \le \omega_0 < \omega_1 \ldots < \omega_{q-1} \le \pi,$$

where q is the prediction order, and $\omega_0$ is the angular frequency of the first LSF coefficient, $\omega_1$ is the angular frequency of the second LSF coefficient, and $\omega_{q-1}$ is the angular frequency of the highest order LSF coefficient.

It is to be understood in the above equation that pi is equivalent to the frequency at half the sampling rate. For example, if the input audio frame is sampled by the ADC 14 at a sampling rate of 8 kHz, then all the above LSF coefficients $\omega_0$ to $\omega_{q-1}$ will lie in the frequency range from 0 to 4 kHz.

In embodiments it may be observed that there may be either no overlap or very little overlap between the frequency ranges of highest order LSF coefficients for audio frames sampled at different sampling frequencies.

In other words, when the audio sampling frequency is varied between one set of audio frames and the next, it may be observed that there is either no overlap or very little overlap between the statistical distributions of the respective highest order LSF coefficients.

For example, in a first group of embodiments the encoder 104 may be arranged to operate in a discontinuous mode of operation (DTX) whereby the encoder 104 may be tasked with producing comfort noise update frames as part of a comfort noise generation (CNG) process. The encoder 104 may be arranged to operate with audio frames sampled at one of two sampling frequencies, 12.8 kHz and 16 KHz.

FIG. 4 presents statistical histograms of the highest order LSF coefficient for both 12.8 kHz sampled audio data, and 16 kHz sampled audio data.

With reference to FIG. 4 it can be seen that for 12.8 kHz sampled audio data and for 16 kHz sampled audio data there is very little overlap between their respective histograms.

For example, it has been observed that the highest order LSF coefficient for 12.8 kHz sampled audio can lie between the limits 3950 Hz and 6328 Hz, and the highest order LSF coefficient for 16 kHz samples audio can lie between the limits 6380 Hz and 7950 Hz.

It is to be appreciated in embodiments that the greater the difference between sampling frequencies of the sampled audio signal then the larger the frequency distance between the distributions of the highest order LSF coefficients.

It is to be further appreciated that embodiments which monitor the value of the highest order LSF coefficient have the advantage of being able to distinguish between different sampling frequencies of the input audio frame.

Some embodiments may deploy a variable mode approach for coding the input audio frame, whereby the coding mode may be changed from one audio frame to the next in accordance with a change in the sampling frequency.

Typically, the variable mode approach may result in a variable bit rate coding of the input audio frame, whereby the bit rate may vary in accordance with the selected coding mode.

It is to be understood, therefore, that the mode of operation of the audio encoder may be identified by the value of highest order LSF coefficient.

It is to be further understood that these embodiments can have the advantage that the encoding mode does not need to be transmitted or stored as part of the encoded bit stream for the decoder.

In a first group of embodiments the encoder may be operating as part of an embedded layer coding environment whereby a core layer is initially produced. The reconstructed core layer encoded signal is then removed from the input audio signal to leave a residual audio signal which is then subsequently encoded using further audio encoding techniques, thereby producing further or higher coding layers.

The core layer encoder may comprise a LPC analyser 312 and LPC to LSF quantizer 314 as described above for the efficient representations of the short term correlations in the signal. The core layer encoder may also comprise the functionality to vary the prediction order of the LPC analyser 312, and therefore the number of LP coefficients used in any subsequent LPC prediction stage. Additionally, the core layer encoder may be arranged to receive audio frames whereby the sampling frequency may be different across different audio frames.

The prediction order of the LPC analyser 312 and the LPC to LSF converter 314 may be selected according to the sampling frequency of the input audio frame. Consequently, the core layer encoder may be viewed as having different modes of coding whereby the mode varies according to the input sampling frequency.

In this example of the first group of embodiments the mode of operation of the core layer encoder may be identified by the value of the highest order LSF coefficient. Consequently there is the advantage that there is no requirement to incorporate an indication of the core layer encoding mode into the encoded bit stream.

It is to be appreciated that the above example comprises a sub set of the coding components which may be found in a core layer encoder. The core layer encoder may have further coding components such as a long term predictor and a secondary codebook excitation which may also be adapted in accordance with the sampling frequency of the input audio signal.

With reference to FIG. 3, the output of the LPC to LSF converter 314 may be passed to the input of a LSF quantizer 316.

The LSF quantizer can map each LSF coefficient for the audio frame to one of a series of finite definite quantized values in order to produce a quantized LSF value. The quantized LSF value may then be referenced by an index value. The index value may then be converted to a binary number in order to facilitate its storage and transmission.

As stated above the frequency position of the highest order LSF coefficient may be dependent on the sampling frequency of the input audio frame.

Furthermore, the range of frequencies within which the highest order LSF coefficient at a particular sampling frequency can be different to the range of frequencies of the highest order LSF coefficient at a further sampling frequency.

In other words, the range of frequencies of a highest order LSF at a first sampling frequency can be distinguished from the range of frequencies of a highest order LSF at a second sampling frequency.

In some embodiments the LSF quantizer 316 can be configured to have a lower and upper frequency limit for a highest order LSF coefficient for a particular sampling rate. The frequency limits may then be checked when the quantized value of the highest order LSF coefficient is produced. If upon checking, it is determined that the quantized highest order LSF is outside the upper and lower frequency limits for the particular sampling rate, then the highest order LSF may be bounded to lie within said frequency range.

In some embodiments the above bounding operation may take the form of reassigning the highest order LSF a quantized value which lies within the assigned frequency range for the particular sampling rate. The highest order LSF may be reassigned a quantized value on the basis that the value selected is the quantized value within the range of frequencies for the sampling rate, and if there are more than two quantization intervals in this range, then the quantization value selected may be the one nearest to the frequency limit exceeded by the highest order LSF.

For instance, if the originally quantized highest order LSF value is greater than the upper frequency limit for the particular sampling frequency then the LSF quantizer 316 may reassign the highest order LSF the quantized value which meets both the criteria of being within the frequency range and being the closest to the upper frequency limit.

Alternatively, the quantized highest order LSF coefficient value may be less than the lower frequency limit for the particular sampling frequency. In this instance the LSF quantizer 316 may reassign the highest order LSF to the quantized value which meets both criteria of being within the frequency range and being the closest to the lower frequency limit.

In some embodiments the highest order LSF coefficient for a particular sampling frequency may be confined to a frequency range according to Table 1 below.

Table 1 depicts the high and low frequency limits for the highest order LSF at different sampling frequencies of the input audio signal.

| Sampling Frequency (Hz) | Lower Frequency Limit for Highest Order LSF (Hz) | Upper Frequency Limit for Highest Order LSF (Hz) |
| --- | --- | --- |
| 8000 | 2000 | 3950 |
| 12800 | 3950 | 6350 |
| 16000 | 6350 | 7950 |
| 25600 | 7950 | 12750 |
| 32000 | 12750 | 15950 |
| 48000 | 15950 | 23950 |

It is to be understood that the high and low frequency limits in Table 1 have been determined experimentally to provide an advantageous result.

It is to be further understood that the high and low frequency limits for each highest order LSF coefficient may be selected such that the frequency ranges do not overlap for different sampling frequencies.

It is to be appreciated that the output of the LSF quantizer 316 can be the LSF quantization indices for the quantized LSF coefficients of the current audio frame.

In other words there is provided means for quantising each of at least two line spectral frequency coefficients to produce at least two quantized line spectral frequency coefficients, wherein a highest order quantized line spectral frequency coefficient of the at least two quantized line spectral frequency coefficients lies within a first frequency range of at least two frequency ranges, wherein the first frequency range is associated with the first sampling rate, and wherein the first frequency range is distinguishable from a second frequency range of the at least two frequency ranges, wherein the second frequency range is associated with a highest order quantized line spectral frequency for an audio frame digitally sampled at a second sampling rate.

With reference to FIG. 3, upon completion of quantization of the LSF coefficients the LSF quantization indices for the current audio frame may be passed out of the LSF quantizer 316 via the connection 307.

It is to be understood in embodiments that the LSF quantization indices may be combined with further speech or audio coding parameters.

In a first group of embodiments the LSF quantization indices may form part of the set of encoded parameters of a core layer encoder. In other words the LSF quantization indices may be combined with other coded speech or audio parameters as part of the core layer encoded parameter set. Furthermore, in the first group of embodiments the core layer encoded parameter set may be combined with further encoded parameter sets relating to higher coding layers of an embedded variable rate speech or audio coding structure.

It is to be understood that the embedded variable rate audio or speech coding denotes an audio or speech coding scheme, in which a bit stream resulting from the coding operation is distributed into successive layers. A base or core layer which comprises of primary coded data generated by a core encoder is formed of the binary elements essential for the decoding of the binary stream, and determines a minimum quality of decoding. Subsequent layers make it possible to progressively improve the quality of the signal arising from the decoding operation, where each new layer brings new information. One of the particular features of layered based coding is the possibility offered of intervening at any level whatsoever of the transmission or storage chain, so as to delete a part of binary stream without having to include any particular indication to the decoder.

In a first group of embodiments the core layer codec may be based on the algebraic codebook excited linear prediction (ACELP) technology.

The quantized, coded information may then in be sent to a bit stream formatter for creating the output bit stream 112 from the encoder 104.

The decoder 108 can receives the encoded signal stream 112 comprising at least in part encoded information representing the quantized LSF coefficients indices together with other encoded speech or audio parameters and outputs a reconstructed audio signal 114.

The parts of the decoder 108 which implement embodiments are shown in FIG. 5.

With reference to FIG. 5, the decoder comprises an input 502 by which the encoded bit stream 112 may be received. As part of the received bit stream 112 there may be quantized LSF coefficient indices which may form part of the encoded parameter set for a speech or audio decoder.

The speech or audio decoder in embodiments may be arranged to operate at varying number of samples per output audio frame and at varying output sampling frequency. In other words, the decoder 108 may be arranged to output a frame of a reconstructed audio signal whereby the number of samples and the sampling rate of the frame may be varied from one frame to the next.

Furthermore the decoder 108 may be arranged to operate with a number of different modes of decoding, where the mode of decoding used may be dependent on the audio frame sampling frequency.

Further still, the bit rate of the encoded parameter set may be different according to the mode of coding used by the encoder.

In some embodiments the speech or audio decoder may be a core layer decoder whose reconstructed audio output may be combined with further reconstructed audio signal outputs from higher layer decoders. The encoded higher layer bits may be sent to the decoder along with the corresponding encoded core layer bits.

With reference to FIG. 5, the quantized LSF indices received as part of the encoded bit stream 112 may be arranged to be passed to the input of a LSF dequantizer 510.

In other words there may be provided means for receiving a set of encoded audio parameters, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder.

In embodiments the LSF dequantizer 510 may be configured to convert the received quantized LSF indices to quantized LSF coefficients.

It is to be appreciated in embodiments that the LSF dequantizer 510 may produce a number of quantized LSF coefficients for each audio frame. The number of quantized LSF coefficients can be predetermined at the encoder by as the prediction order of the LPC analyser 312. For example, in the instance of the LPC analyser 312 a prediction order of the magnitude 10, then the number of quantized LSF coefficients produced by the LSF dequantizer 502 would be also ten.

In other words there may be provided means for converting the indices to the at least two quantized line spectral frequency coefficients.

In embodiments the LSF dequantizer 502 may be arranged to check the value of the highest order quantized LSF in order to determine the mode of decoding.

In the first group of embodiments in which the input audio signal is coded by deploying a layered coding regime, and where the core layer codec can operate at different sampling rates corresponding to different modes of encoding. The particular sampling rate and mode of coding used by the core layer codec may be identified by firstly inspecting the value of the highest order LSF, and then assigning the value to a particular frequency range.

In other words, the decoding mode of a multimode decoder may be determined by the value of the highest order LSF.

In an example of the first group of embodiments in which the core layer codec may be arranged to operate in one of two modes of operation. The first mode of operation may be at an audio frame sampling frequency of 12800 Hz, and the second mode of operation maybe at a sampling frequency of 16000 Hz. With reference to Table 1, if the received highest order quantized LSF for an audio frame is to be determined to be in the frequency range from 3950 Hz to 6350 Hz then operating mode of the core layer decoder may be the mode for decoding the parameters of an audio frame sampled at 12800 Hz. However, if the received highest order quantized LSF for an audio frame is determined to be in the frequency range from 6350 Hz to 7950 Hz then the operating mode of the core layer decoder may be mode for decoding the parameters of an audio frame sampled 16000 Hz.

In other words there is provided means for determining the sampling frequency for an audio frame by checking the value of a highest order quantized line spectral frequency coefficient of the received quantized line spectral frequency coefficients.

The checking of the value of the highest order quantized line spectral frequency coefficient can comprise means for comparing the comparing the highest order quantized line spectral frequency coefficient to each of a plurality of frequency ranges, wherein a first frequency range of the plurality of frequency ranges is associated with a first sampling frequency, and wherein a second frequency range of the plurality of frequency ranges is associated with a second sampling frequency; means for determining the sampling frequency of the audio frame to be the first sampling frequency when the highest order quantized line spectral frequency coefficient lies in the first frequency range; and means for determining the sampling frequency of the audio frame to be the second sampling frequency when the highest order quantized line spectral frequency coefficient lies in the second frequency range.

It is to be understood therefore that the LSF dequantizer 514 may be configured to have two outputs.

The first output may be arranged to be connected to the input of a LSF to LPC converter 512 and may comprise the set of quantized LSF coefficient values.

The second output from the LSF dequantizer 510 may comprise the signalling line 504 which may be used to convey the coding mode and/or sampling rate to subsequent decoding components in the decoder 108.

It is to be understood in embodiments that the operating mode of the decoder may be dependent on the sampling rate of the audio frame. Hence, the signalling line 504 can convey the mode of decoding by either directly carrying the coding mode or alternatively the sampling rate.

In embodiments the quantized LSF coefficient values may be received by the LSF to LPC converter 512 and subsequently converted to a set of LP coefficients.

In order to assist with the conversion process the LSF to LPC converter 512 may be arranged to receive the signalling line 504 as a further input. The signalling line may indicate the sampling frequency of the encoded audio frame and therefore determine the order of the LSF to LPC conversion process.

Alternatively, in other embodiments the signalling line may carry the coding mode which can be used to determine the order of the LSF to LPC conversion process.

The number of elements in the set of LP coefficients will be equivalent to the prediction order.

It is to be understood that the LP coefficients produced by the LSF to LPC converter 512 will correspond with an output audio frame.

It is to be further understood that the output of the LSF to LPC converter 512 may be used by further decoding components in the decoder 108. For example, the LP coefficients may be used as the filter coefficients for any subsequent LP filter.

Furthermore, the signalling line 504 may also be used by further decoding components in order to select the appropriate mode of decoding for the further decoding components in the decoder 108.

The decoding components of the decoder 108 may then form the output audio signal 114.

Although the above examples describe embodiments of the invention operating within a codec within an apparatus 10, it would be appreciated that the invention as described below may be implemented as part of any audio (or speech) codec, including any variable rate/adaptive rate audio (or speech) codec. Thus, for example, embodiments of the invention may be implemented in an audio codec which may implement audio coding over fixed or wired communication paths.

Thus user equipment may comprise an audio codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments of the encoder may be an apparatus comprising at least one processor and at least one memory including computer program code the at least one memory and the computer program code configured to, with the at least one processor, cause the apparatus at least to perform: determining at least two linear prediction coefficients for an audio frame digitally sampled at a first sampling rate; converting the at least two linear prediction coefficients to at least two line spectral frequency coefficients; and quantising each of the at least two line spectral frequency coefficients to produce at least two quantized line spectral frequency coefficients, wherein a highest order quantized line spectral frequency coefficient of the at least two quantized line spectral frequency coefficients lies within a first frequency range of at least two frequency ranges, wherein the first frequency range is associated with the first sampling rate, and wherein the first frequency range is distinguishable from a second frequency range of the at least two frequency ranges, wherein the second frequency range is associated with a highest order quantized line spectral frequency for an audio frame digitally sampled at a second sampling rate.

In some embodiments of the decoder there may be an apparatus comprising at least one processor and at least one memory including computer program code the at least one memory and the computer program code configured to, with the at least one processor, cause the apparatus at least to perform: receiving, a set of encoded audio parameters for an audio frame, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder; converting the indices to the at least two quantized line spectral frequency coefficients; and determining the sampling frequency for the audio frame by checking the value of a highest order quantized line spectral frequency coefficient of the at least two quantized line spectral frequency coefficients.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments of the encoder may be a non-transitory computer-readable storage medium having stored thereon computer readable, which, when executed by a computing apparatus, causes the computing apparatus to perform a method comprising: determining at least two linear prediction coefficients for an audio frame digitally sampled at a first sampling rate; converting the at least two linear prediction coefficients to at least two line spectral frequency coefficients; and quantising each of the at least two line spectral frequency coefficients to produce at least two quantized line spectral frequency coefficients, wherein a highest order quantized line spectral frequency coefficient of the at least two quantized line spectral frequency coefficients lies within a first frequency range of at least two frequency ranges, wherein the first frequency range is associated with the first sampling rate, and wherein the first frequency range is distinguishable from a second frequency range of the at least two frequency ranges, wherein the second frequency range is associated with a highest order quantized line spectral frequency for an audio frame digitally sampled at a second sampling rate.

Furthermore at least some of the embodiments of the decoder may be provided a non-transitory computer-readable storage medium having stored thereon computer readable code, which, when executed by a computing apparatus, causes the computing apparatus to perform a method comprising: receiving, a set of encoded audio parameters for an audio frame, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder; converting the indices to the at least two quantized line spectral frequency coefficients; and determining the sampling frequency for the audio frame by checking the value of a highest order quantized line spectral frequency coefficient of the at least two quantized line spectral frequency coefficients.

The memory may be of any type suitable to the local technical environment and may be implemented using any suitable data storage technology, such as semiconductor-based memory devices, magnetic memory devices and systems, optical memory devices and systems, fixed memory and removable memory, in other words a non-transitory computer-readable storage medium. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   determining at least two linear prediction coefficients for an audio frame digitally sampled at a first sampling rate;
   converting the at least two linear prediction coefficients to at least two line spectral frequency coefficients; and
   quantizing each of the at least two line spectral frequency coefficients to produce at least two quantized line spectral frequency coefficients, wherein a highest order quantized line spectral frequency coefficient of the at least two quantized line spectral frequency coefficients is in a first frequency range of at least two frequency ranges, wherein the first frequency range is associated with the first sampling rate, and wherein the first frequency range is distinguishable from a second frequency range of the at least two frequency ranges, wherein the second frequency range is associated with a highest order quantized line spectral frequency for an audio frame digitally sampled at a second sampling rate.

2. The method as claimed in claim 1, wherein the first frequency range of the at least two frequency ranges spans the frequencies between a first low frequency limit and a first high frequency limit, wherein the second frequency range of the at least two frequency ranges spans the frequencies between a second low frequency limit and a second high frequency limit, and wherein the frequencies spanned by the first frequency range are different from the range of frequencies spanned by the second frequency range.

3. The method as claimed in claim 2, wherein the first sampling frequency is 12.8 kHz and the first frequency range spans the frequencies between the first low frequency limit of 3950 Hz and the first high frequency limit of 6350 Hz, and wherein the second sampling frequency is 16 kHz and the second frequency range spans the frequencies between the second low frequency limit of 6350 Hz and the second high frequency limit of 4 Hz.

4. An apparatus comprising at least one processor and at least one memory including computer code for one or more programs, the at least one memory and the computer code configured to with the at least one processor cause the apparatus to:
   determine at least two linear prediction coefficients for an audio frame digitally sampled at a first sampling rate;
   convert the at least two linear prediction coefficients to at least two line spectral frequency coefficients; and
   quantize each of the at least two line spectral frequency coefficients to produce at least two quantized line spectral frequency coefficients, wherein a highest order quantized line spectral frequency coefficient of the at least two quantized line spectral frequency coefficients is in a first frequency range of at least two frequency ranges, wherein the first frequency range is associated with the first sampling rate, and wherein the first frequency range is distinguishable from a second frequency range of the at least two frequency ranges, wherein the second frequency range is associated with a highest order quantized line spectral frequency for an audio frame digitally sampled at a second sampling rate.

5. The apparatus as claimed in claim 4, wherein the first frequency range of the at least two frequency ranges spans the frequencies between a first low frequency limit and a first high frequency limit, and wherein the second frequency range of the at least two frequency ranges spans the frequencies between a second low frequency limit and a second high frequency limit, and wherein the frequencies spanned by the first frequency range are different from the range of frequencies spanned by the second frequency range.

6. The apparatus as claimed in claim 5, wherein the first sampling frequency is 12.8 kHz and the first frequency range spans the frequencies between the first low frequency limit of 3950 Hz and the first high frequency limit of 6350 Hz, and wherein the second sampling frequency is 16 kHz and the second frequency range spans the frequencies between the second low frequency limit of 6350 Hz and the second high frequency limit of 7950 Hz.

7. A method comprising:
receiving a set of encoded audio parameters for an audio frame, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder;
converting the indices to the at least two quantized line spectral frequency coefficients; and
determining the sampling frequency for the audio frame by checking a value of a highest order quantized line spectral frequency coefficient of the at least two quantized line spectral frequency coefficients.

8. The method as claimed in claim 7, wherein the checking the value of the highest order quantized line spectral frequency coefficient comprises:
comparing the highest order quantized line spectral frequency coefficient to each of a plurality of frequency ranges, wherein a first frequency range of the plurality of frequency ranges is associated with a first sampling frequency, and wherein a second frequency range of the plurality of frequency ranges is associated with a second sampling frequency;
determining the sampling frequency of the audio frame to be the first sampling frequency when the highest order quantized line spectral frequency coefficient is in the first frequency range; and
determining the sampling frequency of the audio frame to be the second sampling frequency when the highest order quantized line spectral frequency coefficient is in the second frequency range.

9. The method as claimed in claim 8, wherein the first frequency range of the plurality of frequency ranges spans the frequencies between a first low frequency limit and a first high frequency limit, and wherein the second frequency range of the plurality of frequency ranges spans the frequencies between a second low frequency limit and a second high frequency limit, and wherein the frequencies spanned by the first frequency range are different from the range of frequencies spanned by the second frequency range.

10. The method as claimed in claim 7, wherein each of the plurality of sampling frequencies is each associated with one of a plurality of different modes of operation of the audio decoder, and wherein the determined sampling frequency of the audio frame is associated with one of the plurality of different modes of operation of the audio decoder.

11. The method as claimed in claim 9, wherein the plurality of sampling frequencies comprises 12.8 kHz and 16 kHz, wherein the frequency range for the sampling frequency of 12.8 kHz has a low frequency limit of 3950 Hz and a high frequency limit of 6350 Hz, and wherein the frequency range for the sampling frequency of 16 kHz has a low frequency limit of 6350 and a high frequency limit of 7950 Hz respectively.

12. An apparatus comprising at least one processor and at least one memory including computer code for one or more programs, the at least one memory and the computer code configured to with the at least one processor cause the apparatus to:
receive a set of encoded audio parameters for an audio frame, wherein the set comprises indices representing at least two quantized line spectral frequency coefficients, wherein the audio frame when decoded comprises audio samples digitally sampled at a sampling frequency, wherein the sampling frequency is one of a plurality of sampling frequencies for an audio decoder;
convert the indices to the at least two quantized line spectral frequency coefficients; and
determine the sampling frequency for the audio frame by checking a value of a highest order quantized line spectral frequency coefficient of the at least two quantized line spectral frequency coefficients.

13. The apparatus as claimed in claim 12, wherein the computer readable code when executed controls the at least one processor to perform checking the value of a highest order quantized line spectral frequency coefficient of the at least two quantized line spectral frequency coefficients by causing the apparatus to:
compare the highest order quantized line spectral frequency coefficient to each of a plurality of frequency ranges, wherein a first frequency range of the plurality of frequency ranges is associated with a first sampling frequency, and wherein a second frequency range of the plurality of frequency ranges is associated with a second sampling frequency;
determine the sampling frequency of the audio frame to be the first sampling frequency when the highest order quantized line spectral frequency coefficient is in the first frequency range; and
determine the sampling frequency of the audio frame to be the second sampling frequency when the highest order quantized line spectral frequency coefficient is in the second frequency range.

14. The apparatus as claimed in claim 13, wherein the first frequency range of the plurality of frequency ranges spans the frequencies between a first low frequency limit and a first high frequency limit, and wherein the second frequency range of the plurality of frequency ranges spans the frequencies between a second low frequency limit and a second high frequency limit, and wherein the frequencies spanned by the first frequency range are different from the range of frequencies spanned by the second frequency range.

15. The apparatus as claimed in claim 12, wherein each of the plurality of sampling frequencies is each associated with one of a plurality of different modes of operation of the audio decoder, and wherein the determined sampling frequency of the audio frame is associated with one of the plurality of different modes of operation of the audio decoder.

16. The apparatus as claimed in claim 14, wherein the plurality of sampling frequencies comprises 12.8 kHz and 16 kHz, wherein the frequency range for the sampling frequency of 12.8 kHz has a low frequency limit of 3950 Hz and a high frequency limit of 6350 Hz, and wherein the frequency range for the sampling frequency of 16 kHz has a low frequency limit of 6350 and a high frequency limit of 7950 Hz respectively.

* * * * *

UNITED STATES PATENT AND TRADEMARK OFFICE
CERTIFICATE OF CORRECTION

Page 1 of 1

PATENT NO. : 9,542,149 B2
APPLICATION NO. : 14/357210
DATED : January 10, 2017
INVENTOR(S) : Ramo et al.

It is certified that error appears in the above-identified patent and that said Letters Patent is hereby corrected as shown below:

In the Claims

Column 20,
Line 55, Claim 3 "4 Hz" should read --7950 Hz--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*